(12) United States Patent
Kubota

(10) Patent No.: US 9,924,051 B2
(45) Date of Patent: Mar. 20, 2018

(54) IMAGE FORMING APPARATUS, METHOD FOR CONTROLLING IMAGE FORMING APPARATUS, AND STORAGE MEDIUM FOR PERFORMING PRINTING BASED ON COLLECTION SETTINGS

(71) Applicant: CANON KABUSHIKI KAISHA, Tokyo (JP)

(72) Inventor: Tomohide Kubota, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/924,516

(22) Filed: Oct. 27, 2015

(65) Prior Publication Data

US 2016/0127584 A1 May 5, 2016

(30) Foreign Application Priority Data

Oct. 30, 2014 (JP) ................. 2014-221267

(51) Int. Cl.
*H04W 36/00* (2009.01)
*H04N 1/00* (2006.01)
*H04N 1/44* (2006.01)
*G06F 3/12* (2006.01)

(52) U.S. Cl.
CPC ....... *H04N 1/00408* (2013.01); *G06F 3/1208* (2013.01); *G06F 3/1253* (2013.01); *G06F 3/1255* (2013.01); *G06F 3/1285* (2013.01); *H04N 1/00204* (2013.01); *H04N 1/4426* (2013.01); *H04N 2201/0094* (2013.01)

(58) Field of Classification Search
CPC ................................ H04N 1/00408

USPC .......................................... 358/1.15
See application file for complete search history.

(56) References Cited

U.S. PATENT DOCUMENTS

| 2001/0024291 A1* | 9/2001 | Mori | G06K 15/02 358/1.12 |
| 2002/0067508 A1* | 6/2002 | Nishikawa | G06K 15/00 358/1.18 |
| 2009/0103139 A1* | 4/2009 | Ozawa | H04N 1/58 358/2.1 |
| 2013/0135668 A1* | 5/2013 | Minagawa | G06F 3/1204 358/1.15 |

FOREIGN PATENT DOCUMENTS

| CN | 101790019 A | 7/2010 |
| CN | 103297638 A | 9/2013 |
| JP | 4033857 A | 1/2008 |
| JP | 2014-42157 A | 3/2014 |

* cited by examiner

*Primary Examiner* — Jacky X Zheng
(74) *Attorney, Agent, or Firm* — Canon U.S.A., Inc. IP Division

(57) ABSTRACT

A controller in an image forming apparatus, which stores print data generated based on a collection setting received from an external apparatus and performs printing in response to an instruction from a user, acquires information about the collection setting of the print data, uses information about the collection setting and coordinate information contained in each of drawing commands included in the print data to divide the drawing command for each page, and lays out, when an instruction to change the collection setting has been issued to the print data by the user, the divided drawing commands based on the instruction to change the collection setting.

15 Claims, 14 Drawing Sheets

FIG. 3B

| DOCUMENT NAME | NUMBER OF COPIES | TWO-SIDED | NUMBER OF COLLECTED PAGES | ARRANGEMENT ORDER |
|---|---|---|---|---|
| DOCUMENT 1.pptx | 1 | ONE-SIDED | 4in1 | FROM TOP LEFT TO RIGHT |
| DOCUMENT 2.xlex | 1 | TWO-SIDED | 1in1 | – |
| DOCUMENT 3.docx | 3 | ONE-SIDED | 2in1 | FROM LEFT TO RIGHT |
| ... | ... | ... | ... | ... |
| DOCUMENT N.docx | 1 | ONE-SIDED | 4in1 | FROM TOP LEFT TO BOTTOM |

FIG. 3C

```
(HEADER INFORMATION)
DOCUMENT NAME:DOCUMENT3.docx
USER NAME:USER A
NUMBER OF PRINT COPIES:3
TWO-SIDED/ONE-SIDED:ONE-SIDED
NUMBER OF COLLECTED PAGES:2in1
ARRANGEMENT ORDER: FROM LEFT TO RIGHT (INFORMATION CORRESPONDING TO FIRST PAGE)
PAGE SIZE INFORMATION:[A, B]
DRAWING COMMAND 1
DRAWING COMMAND 2
       .
       .

(INFORMATION CORRESPONDING TO SECOND PAGE)
PAGE SIZE INFORMATION:[A, B]
DRAWING COMMAND 1
DRAWING COMMAND 2
       .
       .

.
       .
```

| | |
|---|---|
| P1 | =[A, B] |
| Rect1 | =(x1, y1), (x'1, y'1) |
| Line1 | =(x2, y2), (x'2, y'2) |
| Rect2 | =(x3, y3), (x'3, y'3) |
| Line2 | =(x4, y4), (x'4, y'4) |

FIG. 7

<Nin1 AREA REFERENCE TABLE>

| NUMBER OF COLLECTED PAGES | PAGE ORIENTATION | ARRANGEMENT ORDER | SIZE AFTER DIVISION | DISTANCE FROM ORIGIN OF 1P | DISTANCE FROM ORIGIN OF 2P | DISTANCE FROM ORIGIN OF 3P | DISTANCE FROM ORIGIN OF 4P |
|---|---|---|---|---|---|---|---|
| 2in1 | LANDSCAPE | FROM LEFT TO RIGHT | [A/2, B] | (0, 0) | (A/2, 0) | — | — |
| 〃 | 〃 | FROM RIGHT TO LEFT | 〃 | (A/2, 0) | (0, 0) | — | — |
| 〃 | PORTRAIT | FROM TOP TO BOTTOM | [A, B/2] | (0, 0) | (0, B/2) | — | — |
| 〃 | 〃 | FROM BOTTOM TO TOP | 〃 | (0, B/2) | (0, 0) | — | — |
| 4in1 | LANDSCAPE | FROM TOP LEFT TO RIGHT | [A/2, B/2] | (0, 0) | (A/2, 0) | (0, B/2) | (A/2, B/2) |
| 〃 | 〃 | FROM TOP RIGHT TO LEFT | 〃 | (A/2, 0) | (0, 0) | (A/2, B/2) | (0, B/2) |
| 〃 | PORTRAIT | FROM TOP LEFT TO RIGHT | 〃 | (0, 0) | (A/2, 0) | (0, B/2) | (A/2, B/2) |
| 〃 | 〃 | FROM TOP RIGHT TO LEFT | 〃 | (A/2, 0) | (0, 0) | (A/2, B/2) | (0, B/2) |

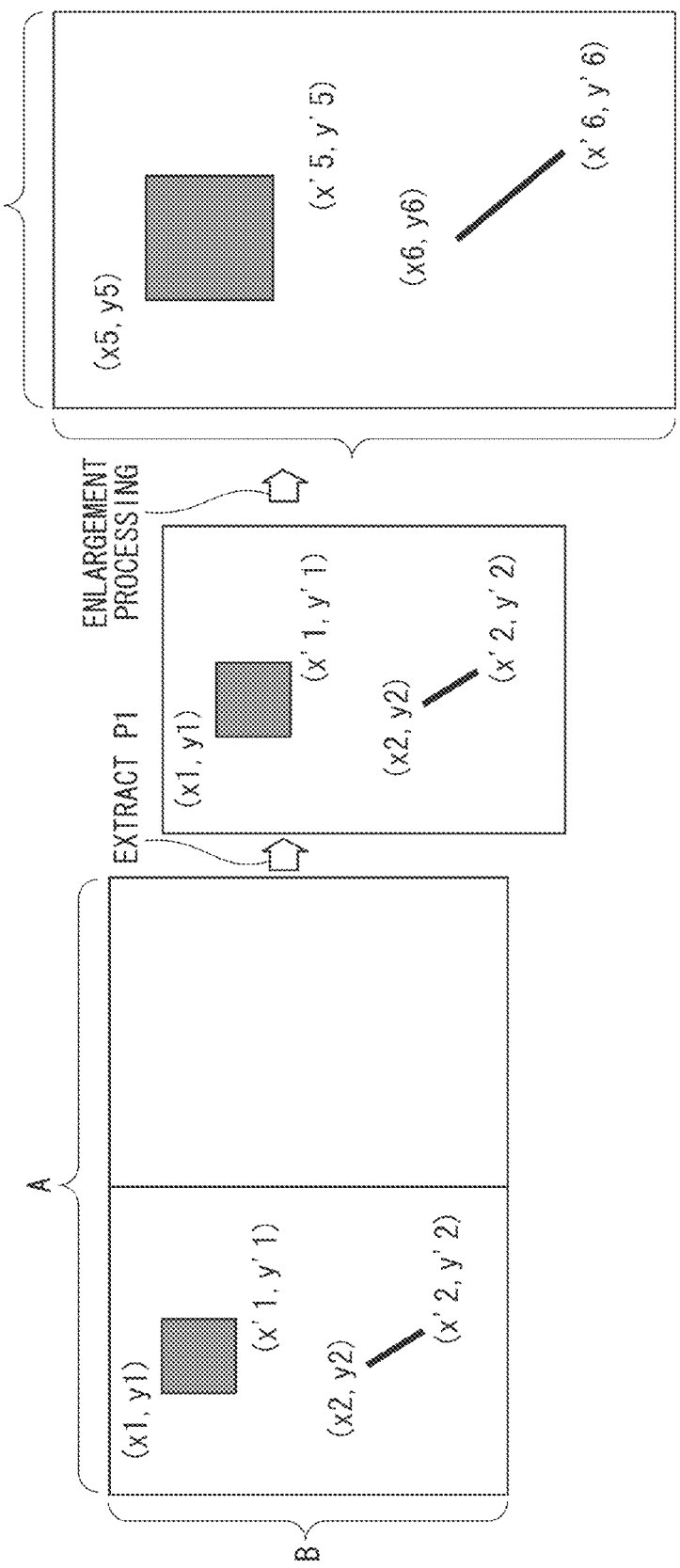

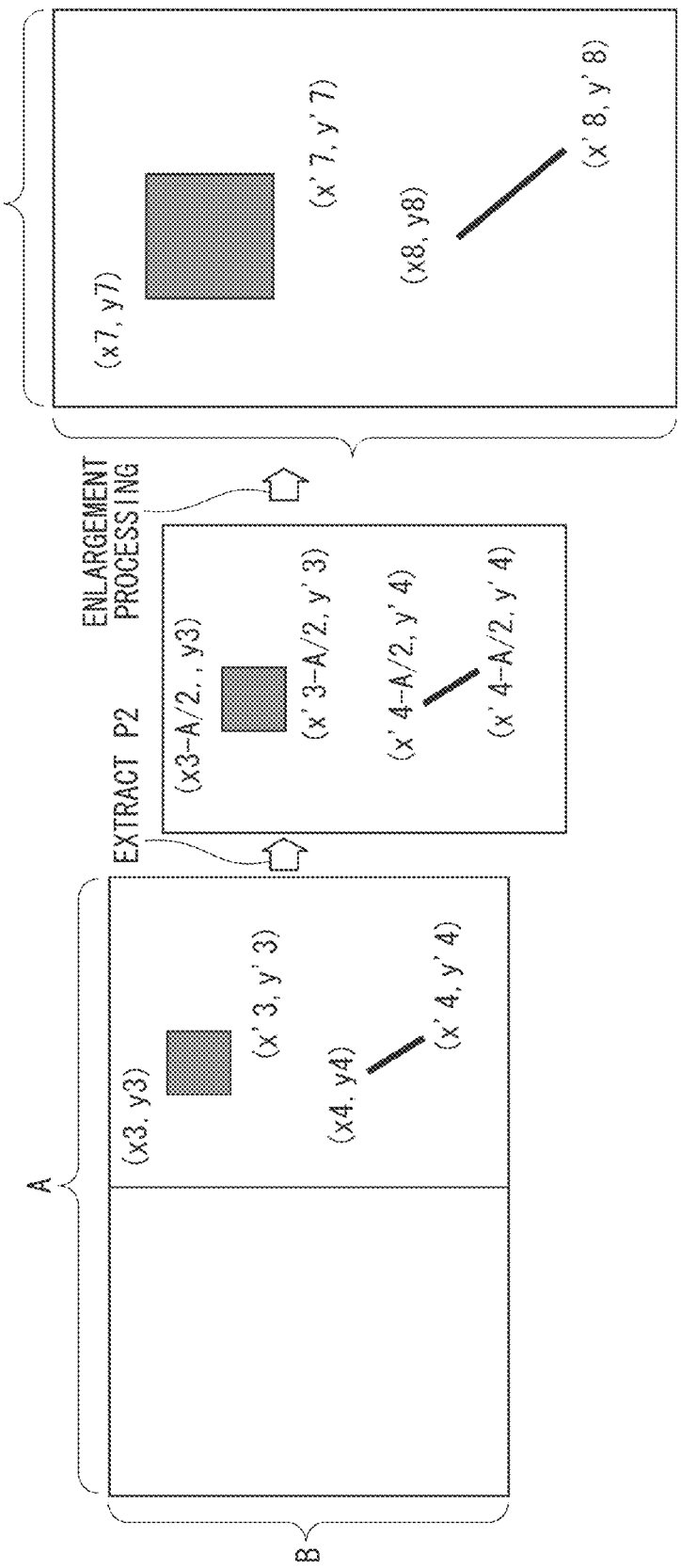

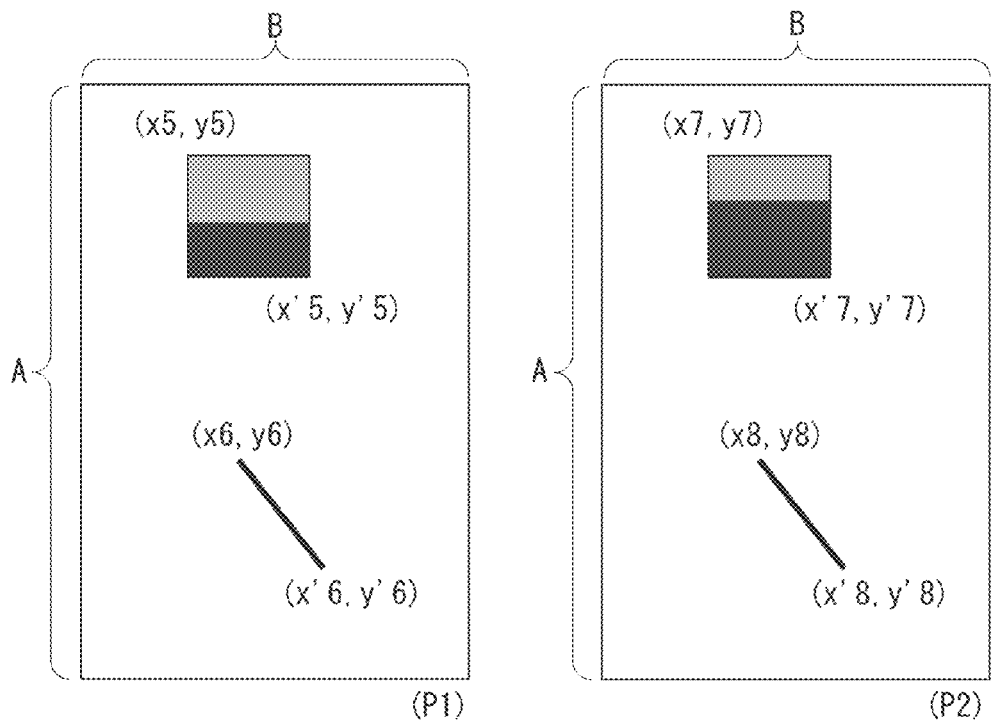

IMAGE FORMING APPARATUS, METHOD FOR CONTROLLING IMAGE FORMING APPARATUS, AND STORAGE MEDIUM FOR PERFORMING PRINTING BASED ON COLLECTION SETTINGS

BACKGROUND OF THE INVENTION

Field of the Invention

The present invention relates to an image forming apparatus.

Description of the Related Art

In recent years, as a network environment has spread, in general, one or more users have shared and used a plurality of image forming apparatuses. Accordingly, a demand for "hold printing" for performing printing after getting through user authentication by the image forming apparatus has been increasing so that a printed product having high confidentiality is not seen by another user when output.

Japanese Patent No. 4033857 discusses a technique for temporarily storing print data transmitted from a host computer within an image forming apparatus having a server function and performing user authentication on the image forming apparatus to print the stored print data.

In the above described printing system, when the print data stored in the image forming apparatus is printed, the user can change a print setting from a user interface (UI) on the image forming apparatus. The print setting that can be changed includes collection printing for collecting a document of a plurality of pages on an application, on a one-page sheet to perform printing. As the case may be, the collection printing is performed in a host computer so that print data, which has already been collectively laid out, may be sent to the image forming apparatus. In the case, a collection setting of the print data, which has already been collectively laid out, may be canceled. For example, the cancellation of the collection setting is carried out in a case where characters become small through the collection printing and are not easy to see by the user or in a case where the user has erroneously performed the collection setting.

To cancel the collection setting of the print data that has already been collectively laid out, data containing a plurality of pages in one page need to be laid out again. Japanese Patent Application Laid-Open No. 2014-42157 discusses a technique for detecting a margin from image data, which has already been collectively laid out, to find a division area and divide the image data.

However, in a conventional technique, processing for determining and canceling collection printing is performed after converting print data into image data. In this case, the image data is enlarged in accordance with a sheet size, resulting in print quality degradation due to a decrease in resolution.

SUMMARY OF THE INVENTION

The present invention is directed to providing a mechanism capable of performing printing, even when a collection setting of print data generated by an external apparatus is changed to perform printing based on the collection setting, without degrading print quality.

According to an aspect of the present invention, an image forming apparatus includes a receiving unit configured to receive print data generated by an external apparatus based on a collection setting for collecting a plurality of pages on one side of a sheet to perform printing, a control unit configured to store the print data received by the receiving unit to perform printing in response to an instruction from a user, an acquisition unit configured to acquire information about the collection setting of the print data, a division unit configured to use the information about the collection setting acquired by the acquisition unit and coordinate information contained in each of drawing commands included in the print data to divide the drawing command for each page, an instruction unit configured to issue an instruction to change the collection setting to the print data by the user, and a layout unit configured to lay out, when the instruction unit has issued the instruction to change the collection setting, drawing commands obtained by the division unit based on the instruction to change the collection setting.

According to the present invention, even when the print data generated by the external apparatus based on the collection setting is printed by changing the collection setting, the printing can be performed without degrading print quality.

Further features of the present invention will become apparent from the following description of exemplary embodiments with reference to the attached drawings.

BRIEF DESCRIPTION OF THE DRAWINGS

FIGS. 3A, 3B, and 3C illustrate print data hold processing by the image forming apparatus.

FIG. 7 illustrates an Nin1 area reference table used in drawing command division processing.

FIGS. 8A and 8B are schematic views illustrating drawing command division processing and re-layout processing.

FIGS. 9A and 9B illustrate examples of print data after drawing command division processing and re-layout processing.

DESCRIPTION OF THE EMBODIMENTS

An embodiment for implementing the present invention will be described below with reference to the drawings.

Figure 1:
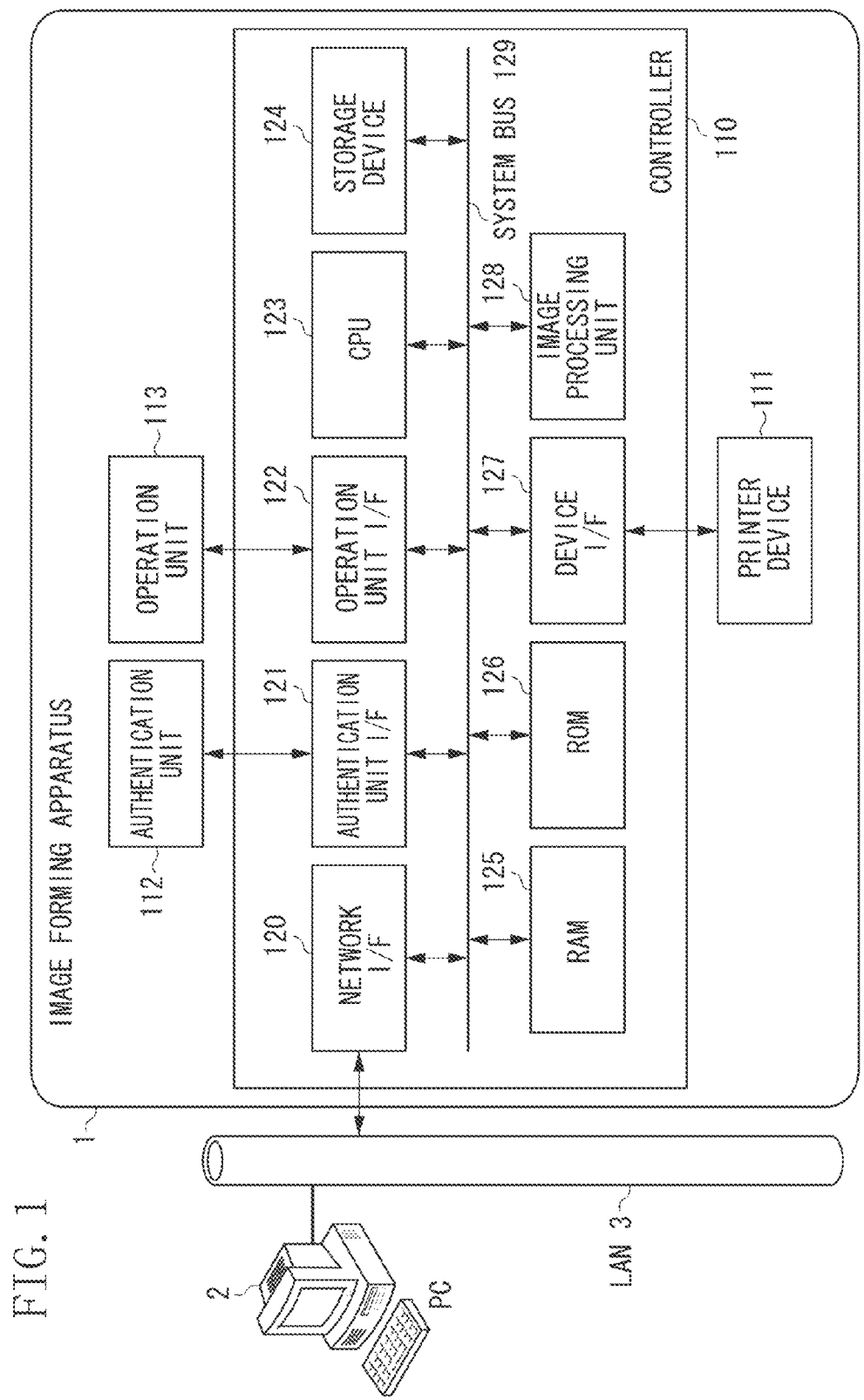
FIG. 1 illustrates a configuration of a printing system including an image forming apparatus according to the present exemplary embodiment.

FIG. 1 illustrates an example of a configuration of a printing system including an image forming apparatus according to a first exemplary embodiment of the present invention.

As illustrated in FIG. 1, the image forming apparatus 1 may be any of a multi function printer (MFP), a single function printer (SFP), and a laser beam printer (LBP). The image forming apparatus 1 may be a printer other than the MFP, the SFP, and the LBP. A printing system is not limited to any particular printers.

The image forming apparatus 1 is connected to an external apparatus such as a host computer (PC) 2, which issues various types of instructions, via a local area network (LAN) 3 such as an Ethernet (registered trademark). The image forming apparatus 1 performs processing according to a printing instruction content from the host computer 2. The image forming apparatus 1 includes a controller 110, a printer device 111, an authentication unit 112, and an operation unit 113.

The controller 110 includes hardware devices such as a network interface (I/F) 120, an authentication unit I/F 121, an operation unit I/F 122, a central processing unit (CPU) 123, a storage device 124, a random access memory (RAM) 125, a read-only memory (ROM) 126, a device I/F 127, and an image processing unit 128. These hardware devices are arranged on a system bus 129. The controller 110 causes the CPU 123 to execute a program stored in the ROM 126, to control the entire image forming apparatus 1.

The network I/F 120 is an interface unit constituted by a local area network (LAN) card, for example, and is connected to the LAN 3 to input and output information to and from the external apparatus. The authentication unit I/F 121 is an interface unit interfacing with the authentication unit 112 and receives authentication information from the outside. The authentication unit I/F 121 functions to receive the authentication information input from the outside and transmit the received authentication information to the CPU 123.

The operation unit I/F 122 is an interface unit interfacing with the operation unit 113 that has a display screen capable of displaying various types of menus and print data information, and outputs operation screen data to the operation unit 113. The operation unit I/F 122 functions to transmit information input by an operator from the operation unit 113 to the CPU 123.

The CPU 123 controls the entire image forming apparatus 1. The storage device 124 is a hard disk drive, and stores system software for various types of processing and input image data. The RAM 125 is a system work memory for the operation of the CPU 123, and is also an image memory for temporarily storing the input image data. The ROM 126 is a boot ROM, and stores a boot program for the printing system. The CPU 123 loads the program stored in the ROM 126 into the RAM 125 and executes the loaded program, as needed, to control the entire image forming apparatus 1.

The device I/F 127 connects the printer device 111 and the controller 110, and performs synchronous/asynchronous conversion of image data. The image processing unit 128 performs processing such as correction and resolution conversion according to the printer device 111 for image data generated by analyzing print data.

The printer device 111 performs printing according to an instruction from the controller 110. The authentication unit 112 functions as a card reader capable of reading information about an identifier (ID) card of a user, and notifies the controller 110 of user information read from the ID card. The operation unit 113 receives the user information from the controller 110, and displays a screen according to the user information. The operation unit 113 receives an operation instruction from the user, and notifies the controller 110 of the received operation instruction.

Figure 2:
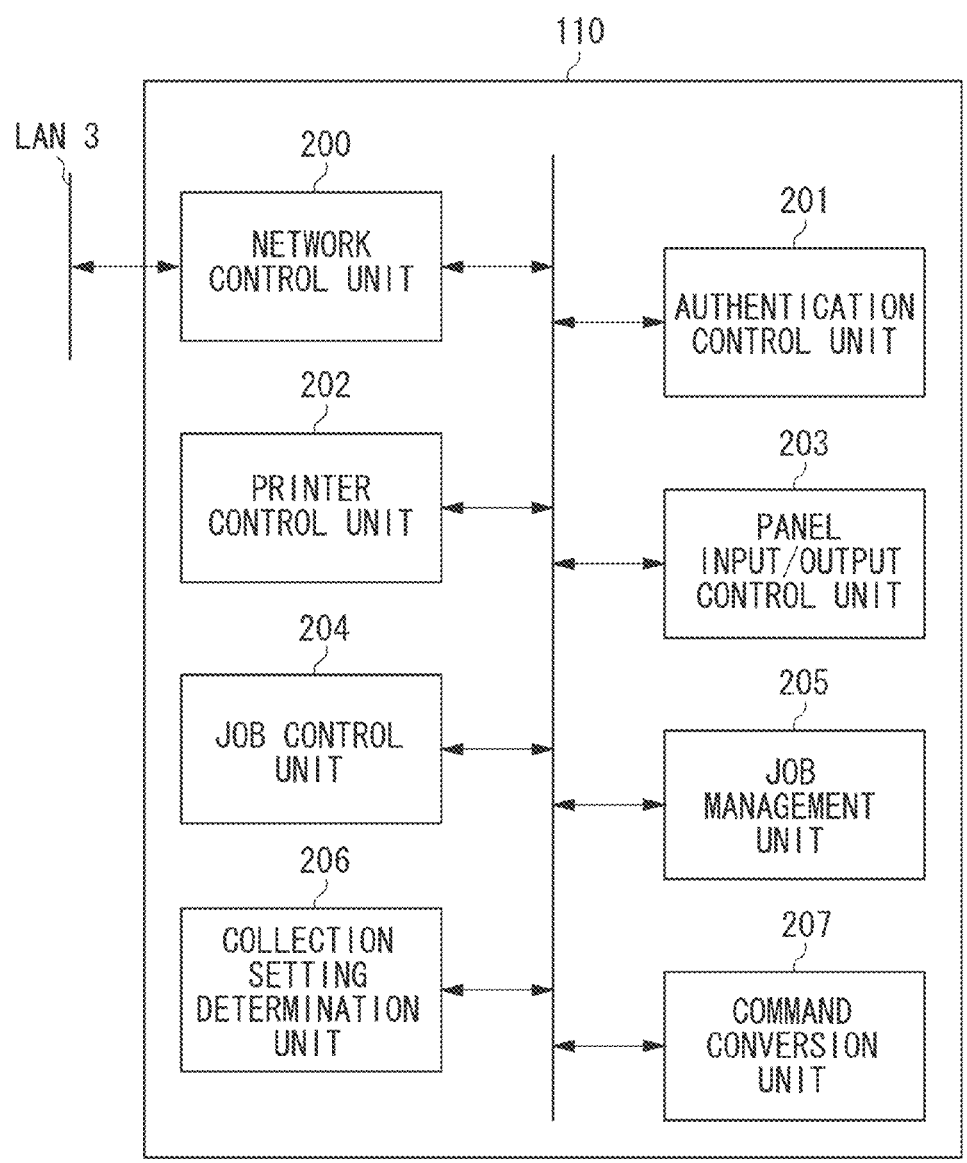
FIG. 2 illustrates a software configuration of the image forming apparatus.

FIG. 2 is a block diagram illustrating a software configuration of the controller 110 that controls an operation of the image forming apparatus 1.

The controller 110 includes a network control unit 200, a printer control unit 202, a job control unit 204, an authentication control unit 201, a panel input/output control unit 203, a job management unit 205, a collection setting determination unit 206, and a command conversion unit 207 as software. The CPU 123 loads a program stored in the ROM 126 into the RAM 125 and executes the program, as needed, to implement the units (200 to 207 illustrated in FIG. 2).

The network control unit 200 notifies the printer control unit 202 of a printing instruction and information about print data that are input via the network I/F 120. The printer control unit 202 controls the image forming apparatus 1 according to information of which it has been notified by the network control unit 200, the authentication control unit 201, and the panel input/output control unit 203. The job control unit 204 analyzes the received print data, notifies the printer device 111 of the generated image data via the system bus 129, and performs print processing.

The authentication control unit 201 receives the authentication information from the authentication I/F 121 via the system bus 129, and notifies the printer control unit 202 of the received authentication information. The panel input/output control unit 203 performs input/output control of the operation unit from the operation unit I/F 122 via the system bus 129. The job management unit 205 stores the print data from the user in the storage device 124 and manages the stored print data, and notifies, based on user information of which it has been notified by the printer control unit 202, the printer control unit 202 and the job control unit 204 of information about the corresponding print data.

The collection setting determination unit 206 determines the collection information based on a setting within the print data and information from the job management unit 206. The command conversion unit 207 performs processing for converting a command within the print data according to a print setting change content.

FIG. 3 illustrates print data hold processing to be executed by the job management unit 205 in the controller 110 included in the image forming apparatus 1.

Figure 3A:
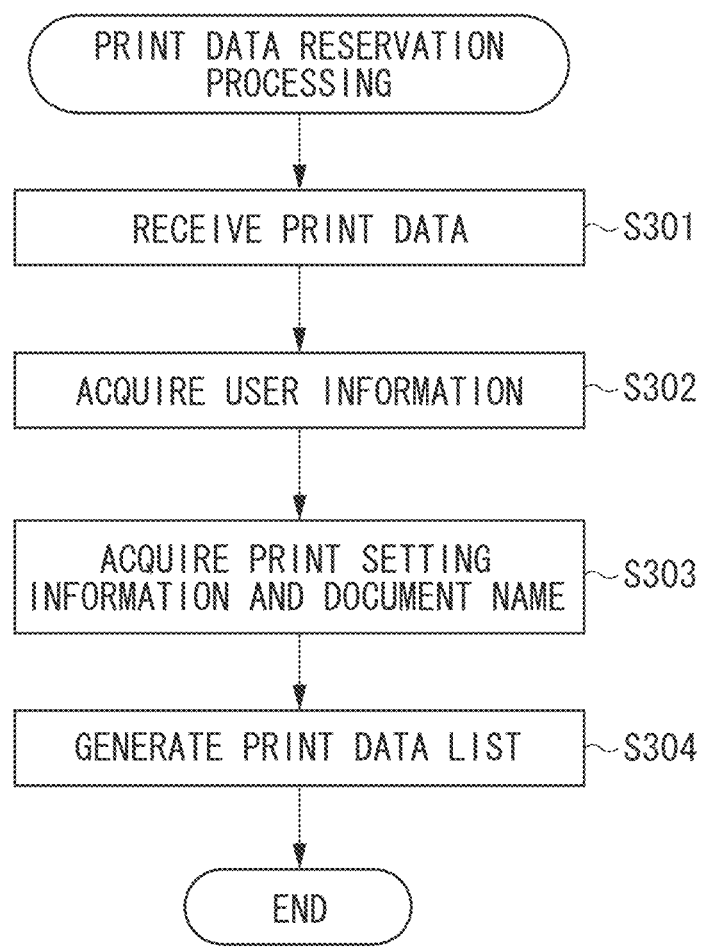

FIG. 3A is a flowchart illustrating print data hold processing to be executed by the job management unit 205. More specifically, the processing illustrated in FIG. 3A is implemented when the CPU 123 loads a program stored in the ROM 126 into the RAM 125 and executes the loaded program, as needed.

FIG. 3B illustrates a print data list corresponding to the user stored in the storage unit 124 by the job management unit 205.

FIG. 3C illustrates an example of a configuration of print data received by the image forming apparatus 1.

In step S301 illustrated in FIG. 3A, the job management unit 205 receives print data transmitted from the host computer 2 via the network control unit 200. The print data is described in a predetermined Page Description Language (PDL), and has header information including various types of setting information at the beginning thereof, followed by information for each page (including drawing commands in a vector format), as illustrated in FIG. 3C, for example. The image forming apparatus 1 can receive such collected print data including the drawing commands in a vector format (print data generated by the PC 2 based on a collection setting for collecting a designated number of pages on one print side of a sheet to perform printing).

In step S302, the job management unit 205 then acquires user information included in the print data that has been received in step S301. While the user information is indicated by "user name: user A" in an example illustrated in FIG. 3C, the user information need not be included in the header information in the print data. For example, the user information may be separately sent from the host computer 2 at a transmission source. The user information may be any information if it can identify a user who has performed printing, for example, a user name or a user ID.

In step S303, the job management unit 205 then acquires print setting information and a document name included in the print data that has been received in step S301. The print setting information includes copy number setting information indicating the number of print copies, two-sided/one-sided setting information indicating whether printing is two-sided printing or one-sided printing, collected page number information indicating the number of collected pages in a collection setting such as 1in1 printing, 2in1 printing, . . . , Nin1 printing, and collection arrangement order information indicating an arrangement order of pages during the collection setting. The collection setting is a setting for collecting a designated number of pages on one print side of a sheet to perform printing.

1in1 is set to print one page in an application on one page of a sheet (one print side), and thus indicates that print data has not yet been collectively printed. 2in1 is set to print two pages in an application on one page of a sheet, and thus indicates that print data has already been collectively printed. Nin1 is set to print any number of pages (N) in an application on one page of a sheet.

In the example illustrated in FIG. 3C, the copy number setting information, the two-sided/one-sided setting information, the collected page number information, and the collection arrangement order information are respectively "3", "one-sided", "2in1", and "left to right".

FIG. 3C is only an example of the print data. The print data need not include a part of the print setting information illustrated in FIG. 3C. At that time, the print data may be an initial setting value of the job management unit 205, or may be set by the user during printing. The print data may include another information added to the print setting information illustrated in FIG. 3C.

In step S304, the job management unit 205 associates the user information which has been acquired in step S302, with the print setting information and the document data which have been acquired in step S303, and adds the associated information as one record to the print data list corresponding to the user information. FIG. 3B illustrates one example record in the print data list. The job management unit 205 then stores the print data list to which the one record has been added, in the storage device 124. The job management unit 205 stores the print data which has been received in step S301, as print data corresponding to the one record added this time, in the storage device 124.

Then, the user moves to a position of the image forming apparatus 1, and selects the print data. After authentication is carried out, an instruction to perform printing is issued.

Figure 4A:
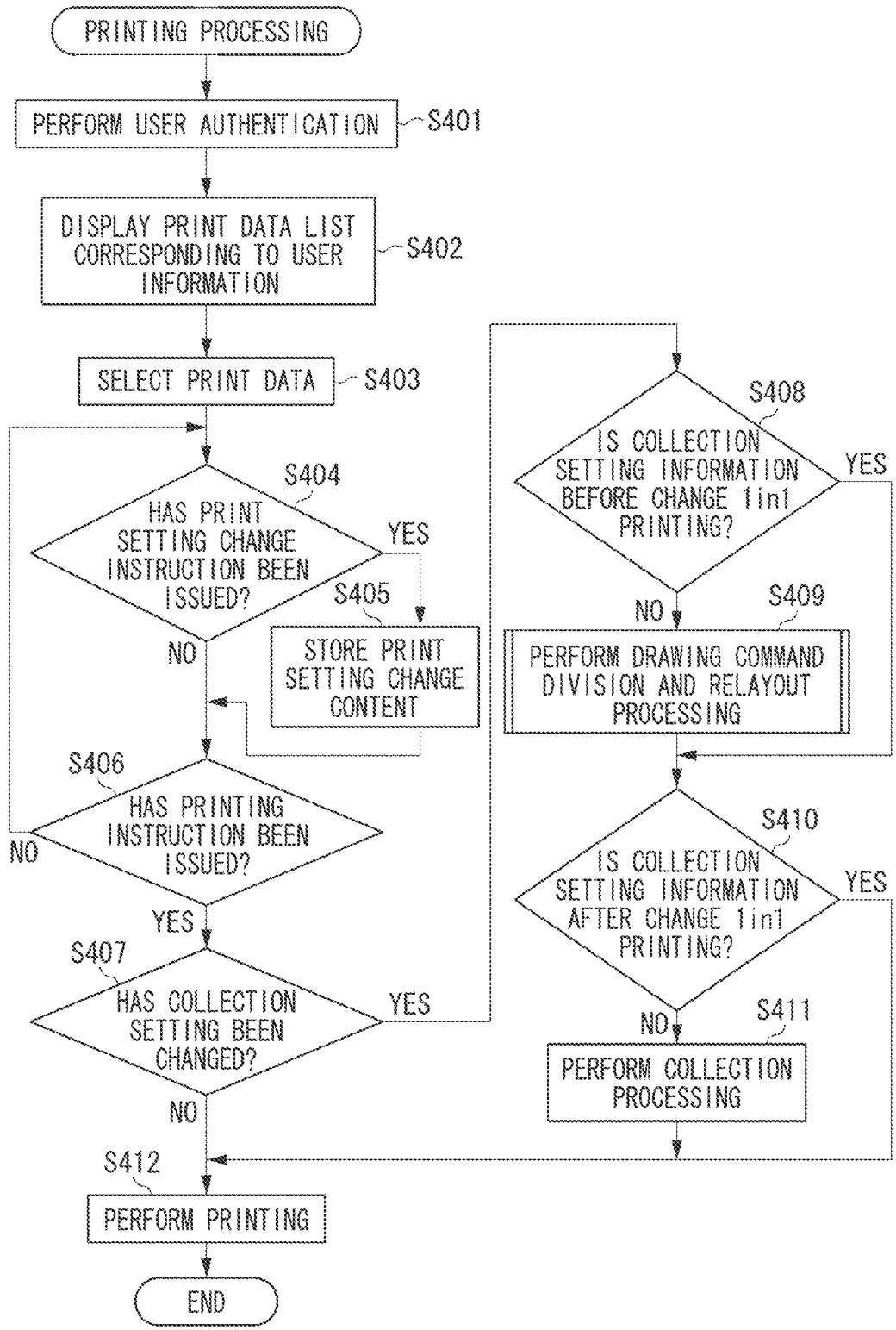
FIG. 4A is a flowchart illustrating printing processing by the image forming apparatus.

FIG. 4A is a flowchart illustrating printing processing to be performed by software (201-207) included in the controller 110 of the image forming apparatus 1. More specifically, the processing illustrated in FIG. 4A is implemented when the CPU 123 loads a program stored in the ROM 126 into the RAM 125 and executes the program, as needed.

Figure 4B:
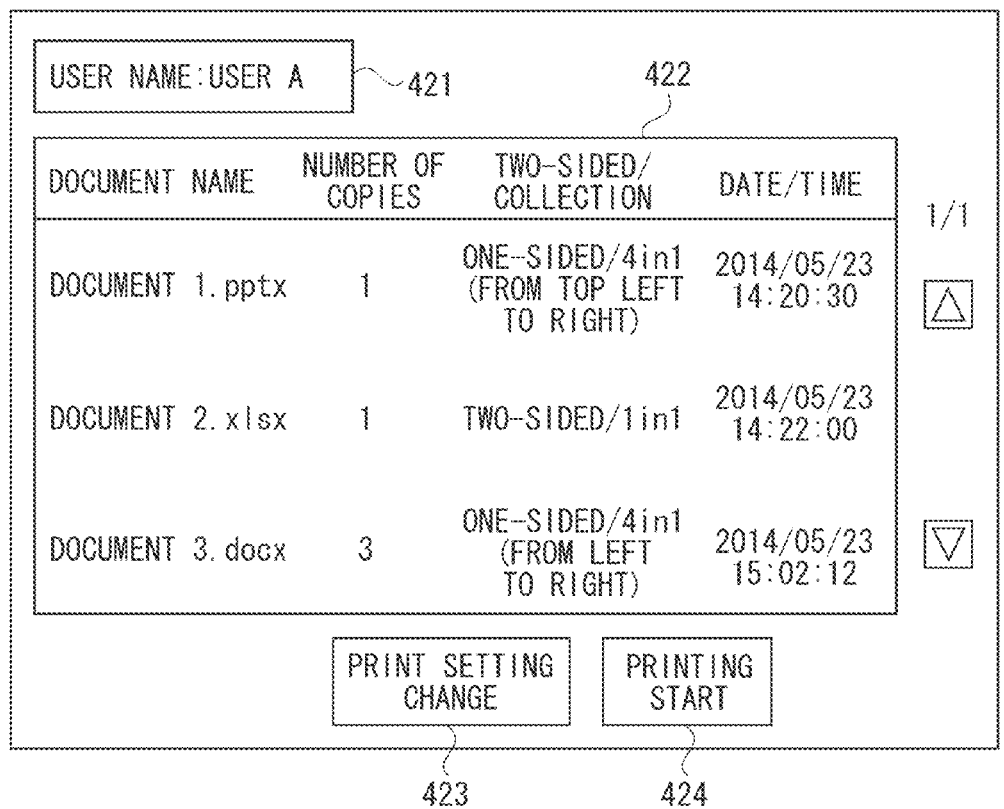
FIG. 4B illustrates a user interface (UI) screen displayed on an operation unit in the image forming apparatus.

FIG. 4B illustrates a UI screen displayed on the operation unit 113.

In step S401 illustrated in FIG. 4A, the authentication control unit 201 receives user information, which has been read from an ID card by the authentication unit 112, via the authentication unit I/F 121 when an ID card of a user is passed over the authentication unit 112, and notifies the printer control unit 202 of the received user information. In the above example, the user information is read from the ID card of the user. However, another known authentication method such as a system for inputting user information and a password from the operation unit 113 to perform user authentication may also be used. The authentication may be performed within the image forming apparatus 1, or may be performed by an authentication server (not illustrated) via the LAN 3.

In step S402, the printer control unit 202 acquires a print data list corresponding to similar user information to the user information which has been acquired in step S401, from the job management unit 205, and notifies the panel input/output control unit 203 of the acquired print data list. The panel input/output control unit 203 produces a display (421) of a user name corresponding to the user information, which has been acquired in step S401, and a display (422) of the print data list corresponding to the user, on the operation unit 113 via the operation unit I/F 122. A display content of the print data list includes a document name of each record, and a print setting and a date corresponding thereto as indicated by the display 422 illustrated in FIG. 4B, for example. The user selects the record to be printed by selecting a document name from the print data list on the operation unit 113.

In step S403, the panel input/output control unit 203 receives information about the print data corresponding to the record selected by the user on the operation unit 113 from the job management unit 205. A method for selecting the print data can be implemented by touching a document name of each record in a case of the example illustrated in FIG. 4B. The present invention is not limited to the example illustrated in FIG. 4B. A UI capable of simultaneously selecting one or more records may also be used.

In step S404, the panel input/output control unit 203 determines whether a print setting change instruction has been issued to the print data that has been selected in step S403. In the example illustrated in FIG. 4B, when a "print setting change" button 423 has been touched, it is determined that the print setting change instruction has been issued. The "print setting change" button 423 is a button capable of issuing an instruction to change a print setting including a collection setting, for the selected print data by the user. If the panel input/output control unit 203 determines that the print setting change instruction has been issued (YES in step S404), the processing proceeds to step S405.

In step S405, the panel input/output control unit 203 displays a print setting change screen (not illustrated) for accepting a change of print setting information (copy number setting information, two-sided/one-sided setting information, collection setting information, etc.) corresponding to the selected print data on the operation unit 113 via the operation unit I/F 122. The panel input/output control unit 203 receives a print setting change content from the operation unit I/F 122, and notifies the printer control unit 202 of the received print setting change content. The printer control unit 202 notifies the job management unit 205 of the received print setting change content. The job management unit 205 rewrites the print setting information included in the print data, if only the print setting information needs to be rewritten. For example, the copy number setting information or the two-sided/one-sided setting information in the print setting change information among the print setting information is rewritten. The job management unit 205 simultaneously rewrites also the print setting information of a corresponding record. The job management unit 205 stores, for example, the collection setting information in which the drawing command change occurs, out of the print setting change information, in the storage device 124 as collection setting change information corresponding to the record in the print data. The collection setting change information includes information indicating that a collection setting has been changed, information about the collection setting before the change, and information about the collection setting after the change.

When the panel input/output control unit 203 completes the process in step S405, the processing proceeds to step S406.

If the panel input/output control unit 203 determines that the print setting change instruction has not been issued (NO in step S404), the processing proceeds to step S406.

In step S406, the panel input/output control unit 203 determines whether a printing instruction has been issued by the user on the operation unit 113. In the example illustrated in FIG. 4B, when a "print start" button 424 has been touched, the panel input/output control unit 203 receives printing instruction information via the operation unit I/F 122, and determines that a print start instruction has been issued. The "print start" button 424 is a button for issuing an instruction to start printing for the selected print data by the user.

If the panel input/output control unit 203 determines that the printing instruction has not been issued by the user (NO in step S406), the processing proceeds to step S404.

On the other hand, if the panel input/output control unit 203 determines that the printing instruction has been issued by the user (YES in step S406), the processing proceeds to step S407.

In step S407, the printer control unit 202 determines whether the collection setting has been changed depending on whether the collection setting change information, which has been stored in step S405, exists. If the collection setting change information has been stored, the printer control unit 202 determines that the collection setting has been changed (YES in step S405), and the processing proceeds to step S408.

In step S408, the printer control unit 202 receives the collection setting before the change of the collection setting change information, which has been stored in step S405, from the job management unit 205, and determines whether the collection setting before the change of the collection setting change information is 1in1 printing. If the printer control unit 202 determines that the collection setting before the change of the collection setting change information is 1in1 printing (YES in step S408), the processing proceeds to step S410.

On the other hand, if the printer control unit 202 determines that the collection setting before the change of the collection setting change information is not 1in1 printing (NO in step S408), the processing proceeds to step S409.

In step S409, the command conversion unit 207 performs drawing command division and re-layout processing based on the collection setting change information acquired by the printer control unit 202. This processing is re-layout processing for converting a layout into a layout for 1in1 printing simultaneously with drawing command division processing, and details thereof will be described below with reference with FIGS. 5 to 9. If the printer control unit 202 completes the process in step S405, the processing proceeds to step S410.

In step S410, the printer control unit 202 receives the collection setting after the change of the collection setting change information from the job management unit 205, and determines whether the collection setting after the change of the collection setting change information is 1in1 printing. If the printer control unit 202 determines that the collection setting after the change of the collection setting change information is 1in1 printing (YES in step S410), the processing proceeds to step S412.

On the other hand, if the printer control unit 202 determines that the collection setting after the change of the collection setting change information is not 1in1 printing (NO in step S410), the processing proceeds to step S411.

In step S411, the command conversion unit 207 performs collection processing based on the collection setting change information acquired by the printer control unit 202. The collection processing is implemented by a known technique for converting 1in1 print data into Nin1 print data. For example, the collection processing is performed to convert a drawing command for each page using affine transformation, and collect drawing commands corresponding to N pages to become one page. When the printer control unit 202 completes the process in step S410, the processing proceeds to step S412.

If the collection setting change information has not been stored, the printer control unit 202 determines that the collection setting has not been changed (NO in step S407), and the processing proceeds to step S412.

In step S412, the job control unit 204 performs rendering processing on the print data, to which the print setting change instruction has been issued (in a case where the print setting has been changed, the print data after change), and transfers image data generated by the rendering to the printer device 111 via the device I/F 127. The printer device 111 prints the image data.

While the drawing command division processing and the re-layout processing, and the collection processing have been performed after the printing instruction in the above described example, the drawing command division processing and the re-layout processing, and the collection processing may be performed at the time that the print setting has been changed.

The drawing command division and re-layout processing are performed, in step S409 during the printing processing illustrated in FIG. 4, by the command conversion unit 207 in the controller 110 of the image forming apparatus 1 according to the present exemplary embodiment. The drawing command division and re-layout processing will be described below with reference to FIGS. 5 to 9.

Figure 5A:
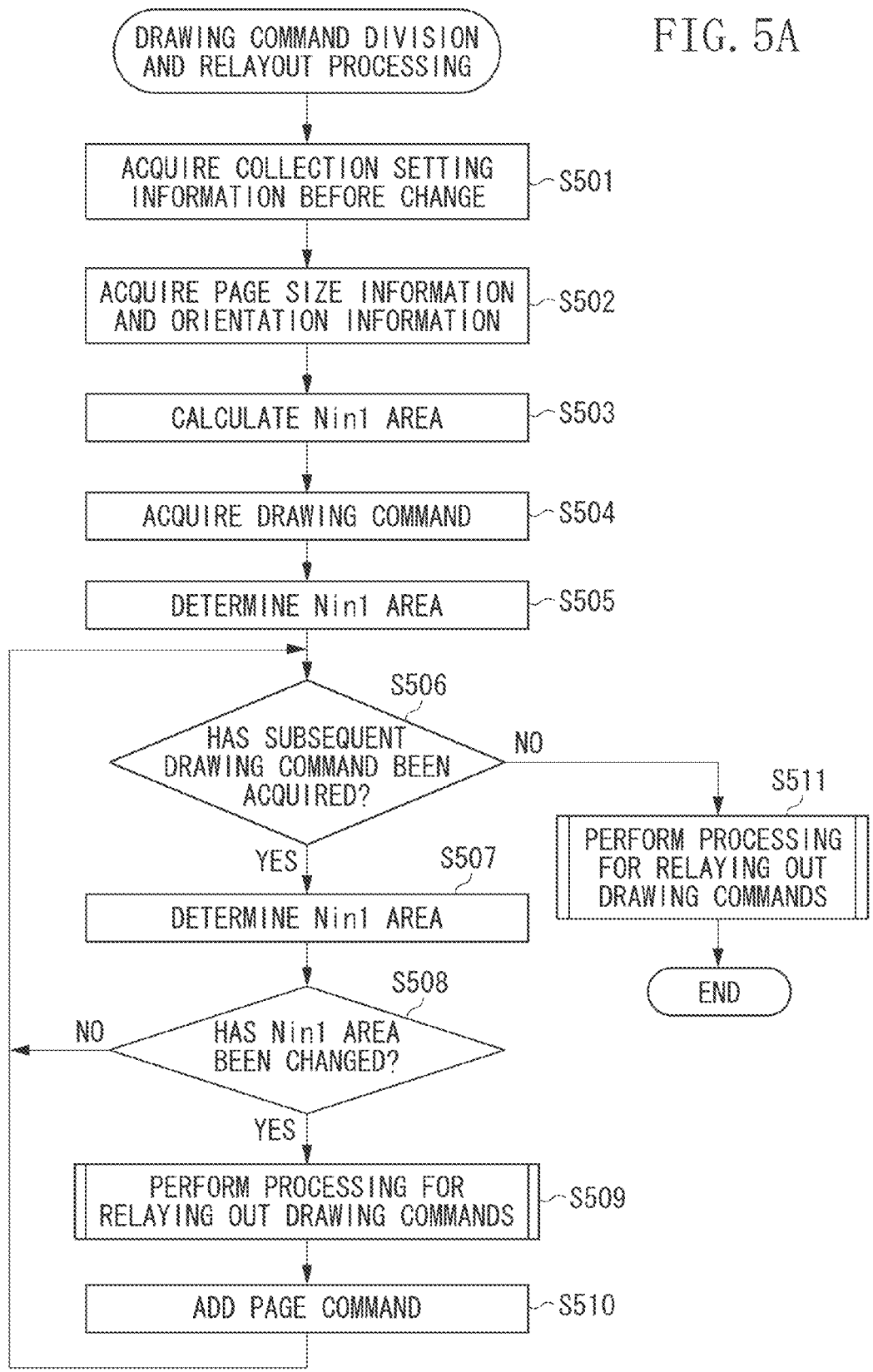
FIG. 5A is a flowchart illustrating drawing command division processing and re-layout processing by the image forming apparatus.

FIG. 5A is a flowchart illustrating the drawing command division processing and the re-layout processing for converting a layout into a layout for 1in1 printing in step S409 illustrated in FIG. 4A.

Figure 5B:
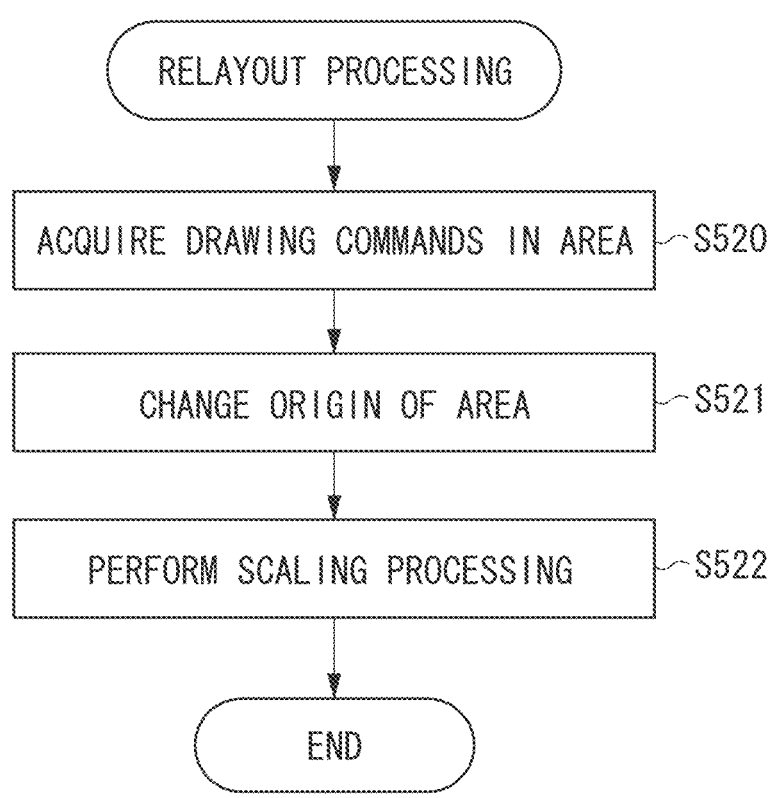
FIG. 5B is a flowchart illustrating processing for re-laying out the drawing commands.

FIG. 5B is a flowchart illustrating details of processing for re-laying out the drawing commands in step S511 illustrated in FIG. 5A.

More specifically, the processing illustrated in FIGS. 5A and 5B is implemented when the CPU 123 loads a program stored in the ROM 126 into the RAM 125 and executes the loaded program, as needed.

Figures 6A, 6B:
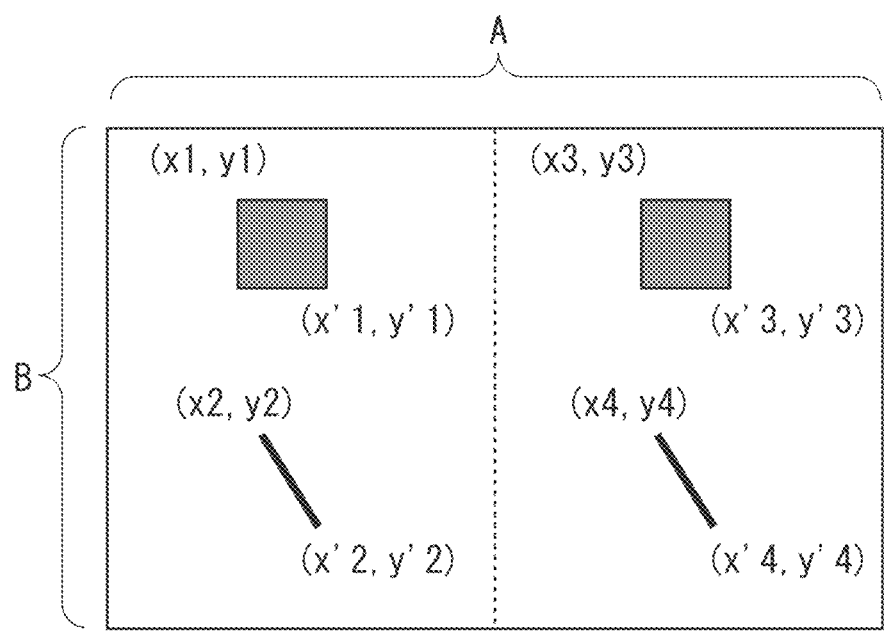
FIGS. 6A and 6B illustrate an example of print data to be subjected to drawing command division processing and re-layout processing.

FIG. 6A is a schematic view illustrating print data in which an arrangement order of pages is from the left to the right in 2in1 printing as collection setting information and orientation information about page data is landscape.

The print data illustrated in FIG. 6A is generated when two-page data including two drawing objects, i.e., a square and a line is printed in 2in1 printing, and the left and the right thereof are respectively the first page and the second page of the original print data.

Values of x and y respectively displayed at a start point and an end point of each of the drawing objects indicate that the drawing object is moved by x in a rightward direction and by y in a downward direction when the top left of the print data is taken as the origin.

A vertical dotted line at the center of the print data is illustrated to make a boundary between the two pages easy to see, and is not included in the actual print data.

FIG. 6B illustrates drawing commands for configuring the print data illustrated in FIG. 6A. In FIG. 6, description on setting information and color information in the print data are omitted to focus on layout conversion.

FIG. 7 illustrates an Nin1 area reference table to be referred to when calculating an Nin1 area.

As illustrated in FIG. 7, the Nin1 area reference table includes collected page number information, page orientation information, arrangement order information, size information after division, and distance information from the origin of each page. The size information after division and the distance information from the origin of each page can be acquired based on the collected page number information, the page orientation information, and the arrangement order information.

Sizes A and B included in the Nin1 area reference table respectively indicate the width and the height of the page.

FIG. 8A is a schematic view illustrating processing for setting back a page included in a left area during 2in1 printing to a layout for 1in1 printing.

FIG. 8B is a schematic view illustrating processing for setting back a page included in a right area during 2in1 printing to a layout for 1in1 printing.

FIG. 9A is a schematic view illustrating a result of conversion of the print data illustrated in FIG. 6 into a 1in1 print layout in the drawing command division processing illustrated in FIG. 5.

FIG. 9B illustrates drawing commands corresponding to a result of conversion of the print data illustrated in FIG. 6 into a 1in1 print layout in the drawing command division processing illustrated in FIG. 5.

Drawing command division and re-layout processing will be described below with reference to FIG. 5A.

In step S501 illustrated in FIG. 5A, the command conversion unit 207 first acquires collection setting information before change from the collection setting change information that has been acquired by the printer control unit 202 in step S408 illustrated in FIG. 4A. In the example illustrated in FIG. 6, the collection setting information indicates that printing is 2in1 printing (the number of collected pages is two) and an arrangement order of the pages is from the left to the right.

In step S502, the command conversion unit 207 acquires page size information included in the print data, compares the width and the height of the acquired page size information, and acquires orientation information (portrait or profile) about the page data.

In the example illustrated in FIG. 6, A and B in a "P1" command respectively indicate page sizes, i.e., a width and a height. When the width and the height are further compared with each other, the width is larger than the height, as illustrated in FIG. 6A. Thus, it is determined that page data orientation information is landscape.

In step S503, the command conversion unit 207 refers to the Nin1 area reference table illustrated in FIG. 7 to calculate Nin1 areas based on the collection setting information, the page size information, and the page data orientation information. The collection setting information, the page size information, and the page data orientation information are collectively referred to as collection layout information.

The example illustrated in FIG. 6 is print data in which printing is 2in1 printing, an arrangement order of pages is from the left to the right, and a page data orientation is landscape. Thus, size information after division and distance information from the origin of each page can be acquired from the Nin1 area reference table illustrated in FIG. 7. As to a 1P (first page), size information after division is [A/2, B], and a distance from the origin is (0, 0). Thus, the Nin1 area becomes an area surrounded by coordinates (0, 0) and (A/2, B) (a first area on the left side of a dotted line at the center illustrated in FIG. 6A). As to a 2P (second page), size information after division is [A/2, B], and a distance from the origin is (A/2, 0). Thus, the Nin1 area becomes an area surrounded by coordinates (A/2, 0) and (A, B) (a second area on the right side of the dotted line at the center illustrated in FIG. 6A). In the present exemplary embodiment, an example of 2in1 printing has been described. In 4in1 printing, print data is equally divided in vertical and horizontal directions into four Nin1 areas, and the Nin1 area is as illustrated in the Nin1 area reference table illustrated in FIG. 7. If four or more pages are printed on one page, print data is equally divided into a designated number of Nin1 areas. Thus, the Nin1 area can be calculated by having similar information to that illustrated in FIG. 7.

In the present exemplary embodiment, print data is analyzed to acquire collection setting information before change (the number of collected pages and a collection arrangement order). However, the collection setting information (the number of collected pages and the collection arrangement order) may be input from the operation unit 113 by the user. In this configuration, the Nin1 area is specified using the collection setting information designated by the user, to divide a drawing command. If information about an arrangement order cannot be acquired, the arrangement order may be a Z direction (from the top left to the right) as a default, and the user may be notified that the arrangement order of pages can differ from that before collection.

In step S504, the command conversion unit 207 acquires the first drawing command from print data to be processed. In the example illustrated in FIG. 6, a drawing command "Rect1" is acquired.

In step S505, the command conversion unit 207 then determines to which of the Nin1 areas calculated in step S503 the drawing command acquired in step S504 belongs. In the example illustrated in FIG. 6, the drawing command "Rect1" has coordinates (x1, y1) at a start point and (x'1, y'1) at an end point, and it is determined that the Nin1 area, which has been calculated in step S503, is the first area on the left side.

In step S506, the command conversion unit 207 then attempts to acquire the subsequent drawing command, and determines whether the drawing command has been acquired. If the command conversion unit 207 determines that the subsequent drawing command has been acquired (YES in step S506), the processing proceeds to step S507. In the example illustrated in FIG. 6, a drawing command "Line1" is acquired.

In step S507, the command conversion unit 207 then determines to which of the Nin1 areas, which have been calculated in step S503, the drawing command, which has been acquired in step S506, belongs. In the example illustrated in FIG. 6, the drawing command "Line1" has coordinates (x2, y2) at a start point and (x'2, y'2) at an end point, and it is determined that the Nin1 area, which has been calculated in step S503, is the first area on the left side.

In step S508, the command conversion unit 207 then determines whether the Nin1 area, which has been determined in step S507, has changed from the Nin1 area to which the preceding drawing command belongs. If the command conversion unit 207 determines that the Nin1 area has not changed (NO in step S508), the processing proceeds to step S506. On the other hand, if the command conversion unit 207 determines that the Nin1 area has changed (YES in step S508), the processing proceeds to step S509. In the example illustrated in FIG. 6, the Nin1 area does not change at the time point where the drawing command "Line1" has been acquired. However, when a drawing command "Rect2" has been acquired, it is determined in step S507 that the Nin1 area is the second area on the right side. Therefore, the Nin1 area changes.

In step S509, the command conversion unit 207 performs re-layout processing for collectively converting the drawing commands (a drawing command set belonging to the one Nin1 area) preceding the drawing command belonging to the Nin1 area that has changed into a 1in1 print layout.

In the example illustrated in FIG. 6, the drawing commands "Rect1" and "Line1" belong to the one Nin1 area. Thus, the drawing commands are collectively converted. Details of the processing will be specifically described with reference to FIGS. 5B and 8A.

In step S520 illustrated in FIG. 5B, the command conversion unit 207 acquires the drawing commands in the Nin1 area (up to the drawing commands preceding the drawing command in which the Nin1 area has changed, in step S509). The drawing commands are included in the first area on the left side, as illustrated in FIG. 8A.

In step S521, the command conversion unit 207 then performs processing for changing the origin of the Nin1 area (the area to which the drawing commands, which have been acquired in step S520, belong). More specifically, the command conversion unit 207 converts, when the origin of the Nin1 area is not the origin of a sheet, coordinates of the drawing commands, which have been acquired in step S520, so that the origin of the Nin1 area becomes the origin of the sheet (translation). An amount of movement of the coordinates corresponds to information about a distance from the origin in the Nin1 area reference table illustrated in FIG. 7. On the other hand, if the origin of the Nin1 area is the origin of the sheet, the command conversion unit 207 does not substantially convert the coordinates of the drawing commands. In the example illustrated in FIG. 8A, the origin of the sheet and the origin of the first area on the left side match each other. Thus, the coordinates are not substantially converted.

In step S522, the command conversion unit 207 then performs scaling processing for scaling each of the coordinates of the drawing commands in the Nin1 area, the origin of which has been changed in step S521, so that the relevant Nin1 area is converted into a 1in1 print layout (i.e., a layout in an uncollected state). In the example illustrated in FIG. 8A, processing for enlarging the size (width: A/2, height: B) of the first area to the size (width: B, height: A) of a 1in1 print layout is performed. Each of the coordinates of the drawing command is enlarged based on a calculated enlargement ratio. As for the ratio, scaling factors before and after the conversion respectively obtained for the width and the height may be used as the enlargement ratio. Alternatively, a scaling factor for either one of the width and the height may be used.

More specifically, the command conversion unit 207 performs affine transformation (including at least one of translation and scaling) of the drawing commands for each page in steps S521 and S522. When the command conversion unit 207 completes the re-layout processing in step S509 illustrated in FIG. 5A (steps S520 to S522 illustrated in FIG. 5B), the processing proceeds to step S510.

In step S510, the command conversion unit 207 adds a page command for a partition between pages because a drawing command in the subsequent Nin1 area exists after the conversion processing (the subsequent drawing command has been acquired in step S506). This page command is a "P2" command, as illustrated in FIG. 9B, and a similar value to that of a "P1" command which is originally present is set. If the command conversion unit 207 completes the process in step S510, the processing proceeds to step S506.

If the command conversion unit 207 determines that the subsequent drawing command has not been acquired (NO in step S506), the processing proceeds to step S511.

In step S511, the command conversion unit 207 performs re-layout processing for collectively converting drawing commands (a drawing command set belonging to the last Nin1 area), which have not been re-laid out in step S509, into a 1in1 print layout (FIG. 5B). In the re-layout processing in step S511, the command conversion unit 207 acquires the drawing command belonging to the last Nin1 area in step S520, and changes the origin of the Nin1 area in step S521, and performs scaling processing in step S522 in FIG. 5B. In the example illustrated in FIG. 6, the drawing commands "Rect2" and "Line2" are collectively converted because they belong to one Nin1 area. In the conversion processing, the second area on the right side is extracted (corresponding to step S520 illustrated in FIG. 5B), as illustrated in FIG. 8B. The second area is found to move by A/2 in an x-coordinate direction with respect to the origin of the sheet based on the distance information from the origin in the Nin1 area reference table illustrated in FIG. 7. Thus, the origin is changed, and a value obtained by subtracting A/2 from an x-coordinate of each of the drawing commands (corresponding to step S21 illustrated in FIG. 5B) is used. Similar processing to that described in step S522 illustrated in FIG. 5B is performed for processing for enlarging the extracted second area.

While the drawing commands belonging to the one Nin1 area have been collectively converted in the above described example, conversion processing may be performed every time the drawing command is acquired.

In the above, a configuration in which the partition between pages is determined based on the change of the Nin1 area to which the drawing command belongs has been described. However, the image forming apparatus 1 may have any configuration if the drawing command is divided for each page by specifying the Nin1 areas to which the drawing command belongs.

By the above described processing, in the image forming apparatus according to the present exemplary embodiment, division areas are obtained based on the collection setting information and the coordinate information about the drawing command for the print data including the drawing commands in a vector format and generated by the external apparatus such as the PC 2. On the basis of the collection setting for collecting the designated number of pages on one print side of the sheet to perform printing, the drawing command is divided for each of the division areas, and the drawing commands obtained by the division are re-laid out. Even when the collection setting of the print data generated by the external apparatus based on the collection setting including the drawing commands in a vector format held in the image forming apparatus 1 is changed (e.g., canceled), therefore, the print data in an uncollected state (the print data before the collection) can be generated without degrading print quality through the drawing command division processing and the re-layout processing. As a result, the collection setting of the print data after the holding can be changed to print the print data without degrading print quality.

The image processing apparatus 1 according to the present exemplary embodiment performs control, control is performed such that if a collection arrangement order can be acquired by analyzing the print data, the change of the collection setting can be made from the user (accept the collection change instruction) based on information about the acquired collection arrangement order. On the other hand, if a collection arrangement order cannot be acquired by analyzing the print data, control is performed such that the change of the collection setting cannot be made from the user (not accept the collection change instruction). A case where the collection arrangement order can be acquired by analyzing the print data means a case where information about the collection arrangement order is written in a header of the print data or a case where the collection arrangement order can be determined as a result of syntax analysis in the print data. Further, a case where the collection arrangement order can be determined as a result of syntax analysis in the print data means a case where the arrangement order can be specified by acquiring from the print data a numeric character that matches a page range of a corresponding page (e.g., 1 to N if the page is the first page in Nin1), and if the acquired numeric character is arranged at a predetermined site (at the top right, top left, or bottom) and all sites at which numeric characters acquired on all the N pages, are arranged are the same, determining the acquired numeric character as a page number.

While the configuration in which the drawing command division processing is performed when the user has issued the collection setting change instruction has been described in the above described exemplary embodiment, the drawing command division processing may be previously performed before the user issues the collection setting change instruction. For example, the image forming apparatus may have a configuration in which when print data is received, processing for dividing a drawing command included in the print data is performed, and re-layout processing and collection processing are performed when the user issues a collection setting change instruction. In a case of this configuration, a page command is not added in the drawing command division processing, and is added when the collection setting change instruction is issued.

As described above, according to the present exemplary embodiment, the print data generated based on the collection setting on the side of the PC 2 is printed by changing the collection setting of the print data on the side of the image forming apparatus 1, printing can be performed without degrading print quality.

It should be noted that the above described various types of data and their details are not limited to the described embodiments, and the present invention includes various configurations and forms depending on uses and purposes.

While one exemplary embodiment has been described above, the present invention can take different embodiments such as a system, an apparatus, a method, a program, or a storage medium. More specifically, the present invention may be applied to a system including a plurality of devices or may be applied to an apparatus including one device.

All combinations of the above described exemplary embodiments are included in the present invention.

Another Exemplary Embodiment

The present invention can also be implemented by processing for supplying a program for implementing one or more functions in the above described exemplary embodiment to a system or an apparatus via a network or a storage medium and reading out and executing the program by one or more processors in a computer in the system or the apparatus.

The present invention can also be implemented by a circuit for implementing one or more functions (e.g., Application Specific Integrated Circuit (ASIC)).

The present invention may be applied to a system including a plurality of devices or applied to an apparatus including one device.

The present invention is not limited to the above described exemplary embodiments. Various modifications (including organic combinations of the exemplary embodiments) can be made according to the gist of the present invention, and are not to be excluded from the scope of the present invention. More specifically, combinations of the above described exemplary embodiments and modifications are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-221267, filed Oct. 30, 2014, which is hereby incorporated by reference herein in its entirety.

What is claimed is:

1. A printing apparatus comprising:
   a controller which includes at least one processor and a memory, wherein the controller is configured to function as:
   a receiving unit configured to receive, from an external device, first PDL data of one page including drawing commands for drawing vector graphics objects, each of the drawing commands having coordinates within the one page, the first PDL data being generated based on N-in-1 print setting by the external device;

a classifying unit configured to classify the drawing commands into N pages, based on the coordinates of the drawing commands; and a conversion unit configured to shift the coordinates of the drawing commands according to a result of the classification, multiply the shifted coordinates by a multiplying factor which is more than 1, and insert a page separation command at a separation of pages of the plurality of pages, in order to convert the first PDL data into second PDL data of the N pages, whose respective sizes are same as the one page, including drawing commands having the multiplied coordinates for drawing larger versions of the vector graphics objects, the larger versions being also vector graphics objects.

2. A printing apparatus comprising:
a printer engine; and
a controller which functions as:
   a reception unit configured to receive, via a local area network from an external device, first page description data for printing N (N>1) pages onto one sheet;
   an accepting unit configured to accept, from a user, a predetermined instruction to change a page layout;
   a conversion unit configured to convert, according to the accepted instruction, the received first page description data into second page description data for printing N larger versions of the N pages onto N sheets respectively; and
   a print control unit configured to control the printer engine to print the larger versions of the N pages onto the N sheets respectively, based on the converted second page description data.

3. The printing apparatus according to claim 2, wherein the conversion unit is configured to insert a page separation command indicating separation between adjacent two pages of the N pages into the first page description data, in order to convert the first page description data into the second page description data.

4. The printing apparatus according to claim 2, wherein the print control unit is capable of controlling the printer engine to print the one page onto a single sheet, based on the first page description data which has not been converted into the second page description data.

5. The printing apparatus according to claim 2, wherein the reception unit is configured to receive the first page description data from an external device which has generated the first page description data.

6. The printing apparatus according to claim 2, wherein the first page description data includes graphics objects and the second page description data includes larger versions of the graphics objects.

7. The printing apparatus according to claim 6, wherein the conversion unit is configured to perform translation and/or scale-up of the graphics objects included in the first page description data, in order to acquire the larger versions of the graphics objects.

8. The printing apparatus according to claim 7, wherein, in order to acquire the larger versions of the graphics objects, the conversion unit is configured:
to classify each of the vector graphics objects included in the first page description data into any one of the N pages, based on a drawing position of the graphics object within the one page;
not to perform translation but to perform scale-up on each graphics object which is classified into a predetermined one of the N pages; and
to perform translation and then to perform scale-up on each graphics object which is classified into any one of the N pages other than the predetermined one.

9. The printing apparatus according to claim 6, wherein the conversion unit is configured to perform coordinate conversion on the graphics objects included in the first page description data, in order to acquire the larger versions of the graphics objects.

10. The printing apparatus according to claim 9, wherein the conversion unit is further configured to classify each of the graphics objects included in the first page description data into any one of the N pages, based on coordinates of the graphics objects,
wherein the conversion unit is configured to perform different coordinate conversions on the graphics objects according to a result of the classification.

11. The printing apparatus according to claim 6, wherein the first page description data and the second page description data are described in a page description language, and the graphics objects and the larger versions are represented by commands in the page description language.

12. The printing apparatus according to claim 2, wherein a size of each of the N sheets is the same as a size of the one sheet.

13. The printing apparatus according to claim 2, wherein the conversion unit scales up the N pages according to the number N.

14. The printing apparatus according to claim 2, wherein the reception unit is further configured to accept a selection of the first page description data from the user, and accept, after the accepting of the selection, the instruction.

15. A printing method comprising:
receiving, via a local area network from an external device, first page description data for printing N (N>1) pages onto one sheet;
accepting, from a user, a predetermined instruction to change a page layout;
converting, according to the accepted instruction, the received first page description data for printing N larger versions of the N pages onto N sheets respectively; and
printing the larger versions of the N pages onto the N sheets respectively, based on the converted second page description data.

* * * * *